Figure 1:
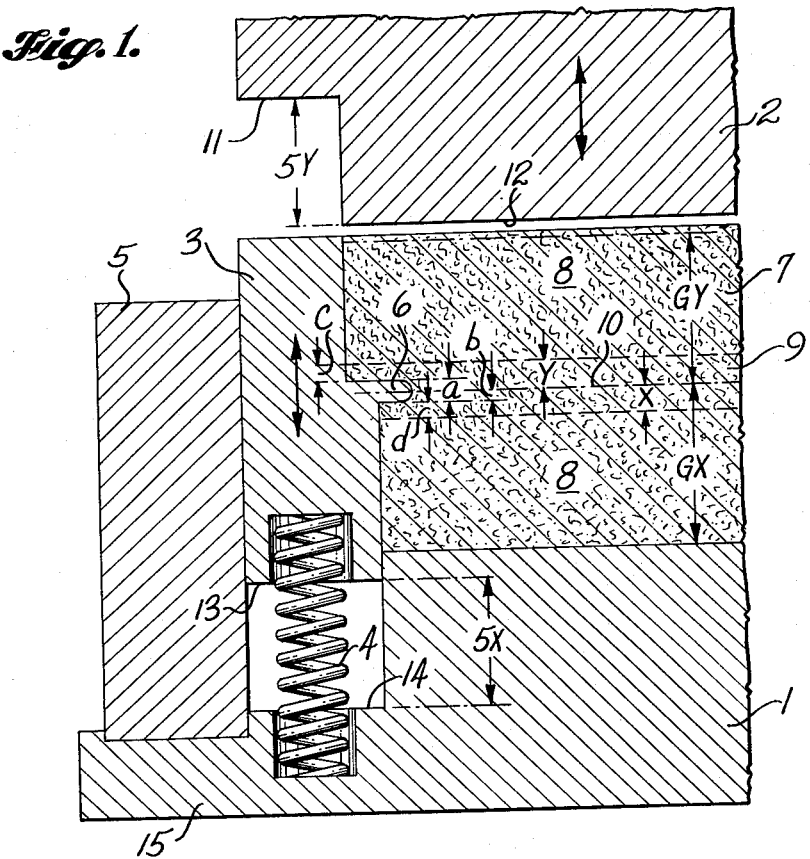
Figure 2:
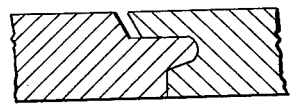
Figure 3:
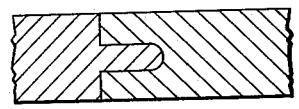
Figure 4:
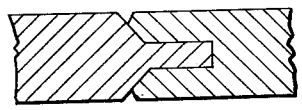

July 19, 1966  E. MUNK  3,261,897

METHOD FOR PRODUCING GROOVED MOLDED PARTS

Filed July 11, 1962

INVENTOR.
EDMUND MUNK 3,261,897
METHOD FOR PRODUCING GROOVED MOLDED PARTS
Edmund Munk, Oberstenfeld, Wurttemberg, Germany, assignor to Furnier- und Sperrholzwerk J. F. Werz Jr. K.G., Werzalit-Pressholzwerk, Oberstenfeld, Oberstenfeld, Wurttemberg, Germany
Filed July 11, 1962, Ser. No. 209,083
Claims priority, application Germany, Aug. 31, 1961, F 34,819
2 Claims. (Cl. 264—109)

The present invention relates to a method for producing pressure-molded parts or preforms of finely shredded fibrous materials which are mixed with a binder, and it is the principal object of the invention to provide such parts or preforms while being molded with lateral recesses in the form of grooves, flutes, or the like. It is another object of the invention also to reinforce the edges and corners of such recesses while being formed in the molding process, and it is a further object also to coat the surfaces of the recess during the molding process.

According to the invention, these objetcs are attained generally by molding the material without any application of lateral pressure around a projection which has a size and shape corresponding to those of the desired recess and forms a component of a movable part of the mold.

For producing tongue-and-groove joints in wood or wood products, such as solid wood, plywood, or chip board, for the purpose of connecting adjacent parts laterally to each other, it is customary to produce the grooves by cutting or milling them into the material. This involves additional work as well as the disadvantage that the structure of the respective material is thereby interrupted so that its solidity is reduced. This disadvantage is especially serious in chip board.

Since the mentioned conventional materials are strongly affected by atmospheric influences and changes in weather, while solid wood has the additional disadvantage of tending to crack and split, it is necessary to subject the surfaces of the parts or products which are made of these materials to an additional weather-proofing treatment, for example, by coating them with paint or enamel or by applying thereon a permanent coating, for example, of metal foil or of paper which is impregnated with melamine resin. However, such a permanent coating cannot be applied upon molded parts of an irregular shape or upon recessed portions, except with great difficulty and expense. Thus, if recesses are cut into such coated parts, moisture may easily penetrate into the open pores of the cut surfaces resulting in warping of the material.

In order to overcome the above-mentioned disadvantages, the present invention provides a method of producing pressure-molded parts of a mixture of finely shredded fibrous organic materials and a thermosetting binder of synthetic resin, which parts may be easily connected to each other without any cutting operations, may be produced either coated or uncoated, and may also consist of preforms or blanks which are thereafter subjected to another molding and finishing treatment. The fibrous materials to be applied may consist of wood chips, jute, bagasse, and numerous other materials.

In order to connect such molded parts to each other the conventional tongue-and-groove joints have proved to be very successful. While the difficulties involved in producing molded parts with projecting tongues are not as serious and may be solved by different procedures which are not concerned in the present invention, it is ordinarily very difficult to provide such parts with lateral recesses in the form of grooves, for example, for tongue-and-groove joints which are not produced by the removal of material from the molded part, for example, by cutting or milling, and which therefore avoid the disadvantages of such cut recesses as mentioned above.

For providing a pressure-molded part with a groove or similar recess during the process of molding the part itself, it is quite conceivable that this may be done by means of a mold which is provided with an additional punch which is movable in the direction toward the desired recess and thus molds this recess into the material. Such a molding tool is, however, very expensive, of considerable dimensions, and of an intricate construction, and because of its intricacy it is easily subject to failures in operation and performance. A further disadvantage of such a method of production is that a part which is molded with such a tool cannot be provided with sharp corners and edges around the recess since by the compressive movement of the additional punch the relatively loose material is pushed away from these areas with the result that the final compressive strength and thus also the solidity of these areas will be considerably lower than that of other areas. Furthermore, in the event that the surfaces of the recess are also to be coated, for example, with resin-impregnated paper, it will be impossible to attain a proper connection between the coating material and the mentioned areas because of their low compressive strength. On the other hand, in front of the punch as seen in the direction of its compression, that is, at an area where this is of no value, an excess of material will be accumulated with the result that this area of the molded part will be excessively compressed. At any rate, it is also impossible with this or any of the known methods to press a recess of a dovetailed cross section into a molded part or its material for connecting the part to another by means of a projection on the latter of a corresponding shape.

The present invention consists in pouring a mixture of finely shredded organic fibrous materials and of a heat-setting binder, for example, an aminoplast, in a loose condition into a mold which has an inner size and shape in a certain proportion to the size and shape of the part to be molded so that, when the mold is in the open position, it will take up the amount of loose molding material as required for the finally molded part, that is, an amount of 4:1 to 10:1 of the molded part. During the molding process of the part itself, a punch which is provided with a projection of a size and shape in accordance with those of the recess to be formed and which is movable in the direction of the molding pressure and is preferably resiliently mounted is pressed by a further movable punch, the main upper die, which acts upon the upper surface of the entire loose material, toward a stationary lower part or female die of the mold. The upper die, while pressing upon the upper surface of the entire body of material in the mold, then moves the recess-forming punch in the molding direction until the material is compressed by the movable die and punch to the desired thickness, especially also around the recess-forming projection on the punch. Since the total volume of the loose material in the mold corresponds to the total thickness of the desired molded part and since it is reduced at the area around the projection merely by the thickness of the latter, the material in this area will be more highly compressed so that, when the molding process is completed, the area around the recess which is formed by the projection will have a higher compressive strength and solidity than the remainder of the molded part. This increased solidity is very desirable since the surfaces defining the recess and the area around it are usually subjected during the use of the molded part to greater stresses than the part itself. The size and shape of the projection on the movable punch correspond at all times to those of the desired recess and may have, for example, a dovetailed shape to produce a recess for a dovetailed joint.

According to the new method, it is possible to produce either a preform or blank in an unheated mold according to the invention or a final part in a heated mold. If a preform is made by the cold-molding process, this preform may thereafter be finally molded according to the same principle in a heated mold. It is then also possible to apply a coating on the entire molded part including the surfaces of the recess either during the same hot-molding stage or in a subsequent procedure in a heated press. This manner of coating is not only very simple, but it also insures an absolutely secure bonding of the coating material to the molded part.

A mold is provided that is especially adapted for carrying out the inventive method. This mold comprises a stationary lower part or female die, a movable upper part or male die, a movable lateral part or punch which is preferably resiliently mounted and provided with a projection of the exact size and shape in accordance with the size and shape of the desired recess, and a stationary guide for the movable lateral part. This mold is designed so that when it is in the open position it will first take up the loose material in accordance with the size and shape of the desired molded part or preform so that during the following compression stroke, the movable main upper die will first press upon the loose material and transmit the built-up pressure during the continued compression stroke also to the lateral punch until it engages with the upper surface of the lateral punch at a point outside of the mold chamber containing the material and then also presses this punch downwardly until both the main upper die and the lateral punch come to rest upon the stationary lower die when the downward stroke of both movable elements is terminated. When the mold is thus closed, the material is compressed therein to the exact size and shape of the desired product. In order to produce a recoil effect, the lateral punch may be acted upon by cup springs, a pneumatic cushion, hydraulic cylinders, or the like so that, when the mold is opened, the lateral punch will automatically return to its basic position and thereby take along the molded part. The lateral punch together with the molded part may then be easily removed from the mold and may then be separated from each other by being carefully pulled apart to withdraw the projection from the recess.

The method according to the invention as well as the basic structure and principles of operation of the mold will now be described with reference to the accompanying drawings, in which—

FIGURE 1 shows a diagrammatic cross-section of one side of a mold in one stage of the method according to the invention for producing a molded part with a groove for a tongue-and-groove joint; while FIGURES 2 to 5 show cross sections of different examples of molded parts which are connected to each other by tongue-and-groove joints, the grooved parts of which may be formed according to the invention.

In the drawings, FIGURE 1 shows a cross section of the essential parts of one half of a mold according to the invention which consists of a stationary lower die 1, a movable upper die 2, a movable lateral punch 3 which is mounted on resilient means of any suitable kind as indicated by a spring 4, and a stationary guide member 5 for guiding the lateral punch 3. This punch 3 is provided with a lateral projection 6 of a size and shape exactly in accordance with the size and shape of the recess to be formed in the molded part. The individual parts of the mold are associated with each other in such a relation that, when the mold is in the open position, it has a filling space 7 of a capacity for taking up a volume of a loose mixture of fibrous organic materials and resinous binder 8 at a ratio of, for example, $6y+6x$ to the volume of $y+x$ of the finally molded part 9. The loose molding material 8 is poured into the filling space 7 until its upper surface is level with the upper side of the lateral punch 3. The distance between this upper side of punch 3 and a center line 10 passing through the projection 6 and shown in dot-and-dash lines corresponds to a compression ratio of, for example, 6:1 or $6y:y$. The same is true for the distance between the center line 10 and the upper side of the lower die 1 which likewise corresponds to a compression ratio of, for example, 6:1 or $6x:x$.

When the mold is in the open position, as illustrated in FIGURE 1, the surface 14 of the lower die 1 on which the lateral punch 3 comes to rest when the mold is closed, is spaced from the lower surface 13 of the lateral punch at a distance of $6x-x=5x$, in which $6x$ represents one half of the filling space 7, namely, the space between the center line 10 and the upper surface of the lower die 1, $x$ represents the thickness of the desired molded part between the center line 10 and its lower surface, and $5x$ represents the distance of travel of the lateral punch 3 during the closing stroke.

Similarly, when the mold is open the surface 11 of the movable upper die 2 which comes to rest on the upper surface of the lateral punch 3 when the mold is closed, is spaced from the lower surface 12 of the upper die 2 at a distance of $6y-y=5y$. During the molding stroke the upper die 2 enters with its part 12 into the filling space 7 where it compresses the molding material 8 and, after moving downwardly for the distance $5y$, its laterally projecting part 11 engages with and then moves the lateral punch 3 downwardly until the mold is in the closed position. During the latter movement, punch 3 travels the distance of $5x$ until, when the mold is in the closed position, the lower end 13 of punch 3 engages upon the upper surface 14 of the lateral part 15 of the lower die 1. When the molding stroke of die 2 and punch 3 is completed, the space $x+y$ contains the finished molded part 9. Thereupon, die 2 is retracted from the mold permitting the resilient ejecting means 4 to press the lateral punch 3 together with the molded part 9 upwardly to the original position of the punch, whereupon these two parts can be easily lifted out of the mold and should then be carefully pulled apart to withdraw the projection 6 from the corresponding recess in the molded part 9.

The different parts of the mold are associated with each other in such a manner that, when the molding stroke is completed, the areas $c$ and $d$ of the molded part above and below the recess which is formed by the projection 6 have a compression ratio relative to the other areas of the molded part which may be calculated as follows: Since $c=y-a$ and $d=x-b$, and the volume of loose material for attaining the areas $c$ and $d$ amounts to $6y-a$ and $6x-b$, respectively, the compression ratio of the areas $c$ and $d$ amounts to $(6y-a):(y-a)$ and $(6x-b):(x-b)$, respectively. Since this ratio is necessarily higher than the compression ratio of the molded part between its outer surfaces and the center line 10, that is, of $6y:y$ or $6x:x$, respectively, it is evident that the areas $c$ and $d$ are more highly compressed than the other areas of the molded part.

Figure 5:
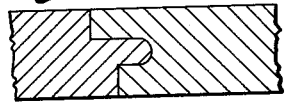

FIGURES 2 to 5 illustrate several examples of tongue-and-groove joints, the grooved parts of which may be molded according to the present invention. FIGURE 5 shows a cross section of two coated parts in which also the surfaces forming the tongue-and-groove joint are coated.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of producing molded parts having recesses in their lateral sides comprising the steps of filling a mixture of a finely shredded organic fibrous material and a heat-setting binder into the open upper side substantially to the level of the upper end of a mold cavity in an amount ranging from 4:1 to 10:1 of the size of the molded part, said cavity defined by a stationary bottom and side walls having a shape and capacity in proportion to the size, shape and compressive strength of the part to be molded, and at least one of said side walls comprising a member movable vertically to said bottom and having a projection extending into said mold cavity and of a size and shape in accordance with the size and shape of a recess to be molded in said part, moving an upper die into the open side of said mold cavity for a certain distance in the direction toward said bottom and to a certain level above said projection and thereby compressing said mixture in said mold cavity and around said projection, and then continuing to move said upper die downwardly and simultaneously and equally moving said member with said projection thereon for a distance substantially equal to said first distance, whereby said mixture is compressed to the size, shape, and compressive strength of the desired molded part and a recess is molded by said projection in said molded part, the area at both sides of said recess then having a compressive strength higher than that of the other areas of said molded part.

2. A method of producing molded parts having recesses in their lateral sides comprising the steps of filling a mixture of a finely shredded organic fibrous material and a heat-setting binder into the open upper side substantially to the level of the upper end of a mold cavity in an amount ranging from 4:1 to 10:1 of the size of the molded part, said cavity defined by a stationary bottom and side walls having a shape and capacity in proportion to the size, shape and compressive strength of the part to be molded, and at least one of said side walls comprising a member movable vertically to said bottom and having a projection extending into said mold cavity and of a size and shape in accordance with the size and shape of a recess to be molded in said part, moving an upper die into the open side of said mold cavity for a certain distance in the direction toward said bottom and to a certain level above said projection and thereby compressing said mixture in said mold cavity and around said projection, then continuing to move said upper die downwardly and simultaneously and equally moving said member with said projection thereon for a distance substantially equal to said first distance, whereby said mixture is compressed to the size, shape, and compressive strength of the desired molded part and a recess is molded by said projection in said molded part, the area at both sides of said recess than having a compressive strength higher than that of the other areas of said molded part, then retracting said upper die from said mold, moving said member together with said molded part out of said mold cavity and finally moving said member and said molded part away from each other to withdraw said projection from said recess.

References Cited by the Examiner
UNITED STATES PATENTS

| | | |
|---|---|---|
| 474,496 | 5/1892 | Crossley. |
| 1,609,460 | 12/1926 | Buttles. |
| 1,885,364 | 11/1932 | Lewis _____ 52—593 XR |
| 2,075,514 | 3/1937 | Ellis _____ 52—593 XR |
| 2,135,803 | 11/1938 | Dument _____ 264—111 |
| 2,324,916 | 7/1943 | Duncan et al. ____ 52—593 XR |
| 2,336,982 | 12/1943 | Cremer _____ 264—111 XR |
| 2,360,528 | 10/1944 | Talmage _____ 18—16.5 XR |
| 2,582,922 | 1/1952 | Crowley _____ 18—16.5 XR |
| 2,719,328 | 10/1955 | Patton et al. |
| 2,740,990 | 4/1956 | Miller et al. _____ 264—109 |
| 2,851,730 | 9/1958 | Wilhelmi et al. |
| 2,981,976 | 5/1961 | Maier. |
| 3,063,098 | 11/1962 | Eyberger. |
| 3,079,730 | 3/1963 | Donegan _____ 20—92 XR |

FOREIGN PATENTS 1,198,332  12/1959  France.

ALEXANDER H. BRODMERKEL, *Primary Examiner.*

ROBERT F. WHITE, *Examiner.*

P. E. ANDERSON, *Assistant Examiner.*